United States Patent

Yamashita

[11] Patent Number: 5,846,652
[45] Date of Patent: Dec. 8, 1998

[54] COVER MATERIAL, CARRIER TAPE, AND TAPING APPARATUS

[75] Inventor: Rikiya Yamashita, Tokyo-To, Japan

[73] Assignee: Dai Nippon Printing Co., Ltd., Japan

[21] Appl. No.: 594,888

[22] Filed: Feb. 9, 1996

[30] Foreign Application Priority Data

Apr. 27, 1995 [JP] Japan ................................ 7-127297

[51] Int. Cl.$^6$ ............................... B32B 7/12; B32B 27/00
[52] U.S. Cl. ..................... 428/349; 428/328; 428/343; 428/354; 428/922
[58] Field of Search ....................... 428/323, 328, 343, 349, 354, 355, 356, 922, 355 R

[56] References Cited

U.S. PATENT DOCUMENTS

| | | | |
|---|---|---|---|
| 4,590,534 | 5/1986 | Akamatsu et al. | 361/212 |
| 4,963,405 | 10/1990 | Yamashita et al. | 428/40 |
| 5,208,103 | 5/1993 | Miyamoto et al. | 428/349 X |
| 5,346,765 | 9/1994 | Maeda et al. | 428/354 |
| 5,441,809 | 8/1995 | Akhter | 428/354 |

FOREIGN PATENT DOCUMENTS

| | | |
|---|---|---|
| 0 372 728 A2 | 6/1990 | European Pat. Off. |
| 0 372 728 A3 | 6/1990 | European Pat. Off. |
| 0 466 937 A1 | 1/1992 | European Pat. Off. |
| 0 501 068 A1 | 9/1992 | European Pat. Off. |
| 0 560 373 A3 | 3/1993 | European Pat. Off. |
| 0 560 373 A2 | 9/1993 | European Pat. Off. |
| WO 94/00971 | 1/1994 | WIPO |

OTHER PUBLICATIONS

Patent Abstracts of Japan—vol. 95, No. 004 & JP 07 096585 A (Dai Nippon Printing Co., Ltd.), Apr. 11, 1995—abstract.
Patent Abstracts of Japan—vol. 95, No. 004 & JP 07 096967 A (Dai Nippon Printing Co., Ltd.), Apr. 11, 1995—abstract.
Patent Abstracts of Japan—vol. 096, No. 001, Jan. 31, 1996, & JP 07 238216 A (Plus Teku KK), Sep. 12, 1995—abstract.

*Primary Examiner*—Daniel Zirker
*Attorney, Agent, or Firm*—Parkhurst & Wendel, L.L.P.

[57] ABSTRACT

A cover material has a biaxially oriented resin layer, a heat sealant layer in which an electrically conductive fine powder composed mainly of barium sulfate particles surfaces of which are coated with tin oxide doped with antimony is dispersed in a thermoplastic resin, and an intermediate layer. The intermediate layer comprises 30 to 50% by weight of an ethylene-α-olefin copolymer having a density of from 0.915 to 0.940 g/cm$^3$, and 70 to 50% by weight of a styrene-butadiene block copolymer composed of 50 to 90% by weight of styrene and 50 to 10% by weight of butadiene. A carrier tape having a plurality of embossed portions is made of a polycarbonate sheet containing from 5 to 30% by weight of electrically conductive carbon fine particles. A taping apparatus is produced by heat-sealing the above cover material to the above carrier tape so as to cover the embossed portions.

9 Claims, 3 Drawing Sheets

COVER MATERIAL, CARRIER TAPE, AND TAPING APPARATUS

BACKGROUND OF THE INVENTION

1. Field of the Invention

The present invention relates to a cover material, a carrier tape, and a taping apparatus produced by them, and particularly to a carrier tape made of a polycarbonate resin, a cover material used therefor, and a taping apparatus composed of them.

2. Related Background Art

An embossed carrier type of taping apparatus is used in such a structure that electronic parts are housed in embossed portions of a carrier tape having many embossed portions formed therein. The embossed portions of the carrier tape are hermetically sealed by heat-sealing of a cover material (cover tape) onto the carrier tape so as to cover the embossed portions. The carrier tape used for the embossed carrier type of taping apparatus is usually made of a material that is readily formable into a sheet, such as a polyvinyl chloride, a polystyrene, and a polypropylene. Further, the cover material is provided with a biaxially oriented resin film and a heat sealant layer formed on either surface of the film. Since there is such a risk that deterioration or destruction of electronic parts is brought about by static electricity generated due to contact of the housed electronic parts with the embossed portions of the carrier tape or with the cover material and by static electricity generated when the cover material is peeled off from the carrier tape, the carrier tape and the cover material need to include means for preventing it.

In order to prevent generation of static electricity in the carrier tape, means normally employed were mixing electrically conductive carbon fine particles or metal fine particles in the carrier tape or applying such particles onto the carrier tape. In order to prevent generation of static electricity in the cover material, means normally employed were mixing an antistatic agent such as a surfactant, electrically conductive carbon fine particles, or metal fine particles in the heat sealant layer in direct contact with the electronic parts or to apply either of them onto the heat sealant layer.

However, the conventional embossed carrier type of taping apparatus as described above had a problem that the carrier tape and the cover material had extremely low transparency because of the electrically conductive carbon fine particles contained therein as an antistatic agent, which made it difficult to check the electronic parts housed in the embossed carrier type of taping apparatus from the outside.

Further, the coating of the surfactant had a problem that it changed a surface condition of the heat sealant layer of the cover material to make the sealing property of the heat sealant layer unstable, thus resulting in a failure of sealing, and a problem that a stable antistatic effect was not obtained because of a strong dependence of electrostatic diffusion on the temperature or the humidity during storage.

Furthermore, the heat-sealing of the cover material to the carrier tape was required to yield such predetermined strength that the electronic parts could be prevented from dropping out because of separation of the cover material during transportation and storage of the embossed carrier type taping. However, too high heat-sealing strength raised another problem of causing such an accident that when the cover material was peeled off in a packaging process of electronic parts, vibration of the carrier tape caused the electronic parts to spring out from the embossed portions of the carrier tape. Accordingly, the cover material was required to adhere to the carrier tape with sufficient strength and to have good peelability in use of the electronic parts. This raised a problem that it was hard to determine conditions such as the temperature, the time, or the like of heat-sealing.

Proposed as a means to solve the above problems was a cover material having an intermediate layer, which was formed between the biaxially oriented resin film and the heat sealant layer forming the cover material and which was made of either one polyolefin selected from a polyethylene, an ethylene-vinyl acetate copolymer, an ionomer, a polypropylene, and modified products of the foregoing (Japanese Laid-open Patent Application No. 5-8339). This cover material is peelable at the interface between the intermediate layer and the heat sealant layer in peeling-off, but has a problem that it is not easy to control peel strength (adhesion) between the intermediate layer and the heat sealant layer.

Further, the resins used for the carrier tape, such as a polyvinyl chloride, a polystyrene, and a polypropylene were inferior in continuous heat resistance because of properties of the resins per se. Thus, if these resins were used for the carrier tape to be formed from a resin sheet selected therefrom and if the carrier tape was stored at high temperature (for example, in a shipment condition at about 60° C.), problems arose, for example such as deformation of formed portions (embossed portions), deviation of pitch of feed holes (sprocket holes), etc. Further, in shaping or forming the carrier tape, the embossed portions were normally formed by shaping a pre-heated portion of the above resin sheet by a metal mold. However, shrinkage or expansion of the resin sheet occurred in the pre-heating, and steps to determine the dimensions of the mold for forming the feed holes (sprocket holes) and the embossed portions with high dimensional accuracy, taking such shrinkage or expansion into account, were very complicated. Furthermore, there was another problem that if a non-stretched portion existed due to unevenness of the pre-heating, a hole could be made in this portion.

SUMMARY OF THE INVENTION

The present invention has been accomplished under such circumstances, and an object of the present invention is to provide a heat resistant carrier tape made of a polycarbonate, a cover material having an excellent electrostatic property and transparency and also having a high adhesive property and good peelability relative to the above carrier tape, and an embossed carrier type of taping apparatus composed of the foregoing carrier tape and cover material.

In order to attain the above object, a cover material of the present invention comprises a biaxially oriented resin layer, a heat sealant layer, and an intermediate layer which is located adjacent to the heat sealant layer and between the biaxially oriented resin layer and the heat sealant layer. The heat sealant layer comprises a thermoplastic resin, and an electrically conductive fine powder dispersed in said thermoplastic resin and composed of barium sulfate particles the surfaces of which are coated with tin oxide doped with antimony. The intermediate layer comprises a resin composition including 30 to 50% by weight of an ethylene-α-olefin copolymer having a density of from 0.915 to 0.940 g/cm$^3$, and 70 to 50% by weight of a styrene-butadiene block copolymer composed of 50 to 90% by weight of styrene and 50 to 10% by weight of butadiene.

Further, a carrier tape of the present invention comprises a polycarbonate and 5 to 30% by weight of electrically conductive carbon fine particles in the polycarbonate, and has a plurality of embossed portions.

Furthermore, a taping apparatus of the present invention comprises the carrier tape and the cover material heat-sealed to each other so that the cover material may cover the embossed portions of the carrier tape.

The resin forming the carrier tape with a plurality of embossed portions comprises the polycarbonate and 5 to 30% by weight of electrically conductive carbon fine particles, which imparts heat resistance and antistatic characteristics to the carrier tape. Further, the cover material comprises the biaxially oriented resin layer, the heat sealant layer wherein the electrically conductive fine powder is dispersed in the thermoplastic resin, and the intermediate layer located adjacent to the heat sealant layer and between the biaxially oriented resin layer and the heat sealant layer and comprising the resin composition including 30 to 50% by weight of the ethylene-α-olefin copolymer having the density of from 0.915 to 0.940 g/cm$^3$, and 70 to 50% by weight of the styrene-butadiene block copolymer composed of 50 to 90% by weight of styrene and 50 to 10% by weight of butadiene, and the electrically conductive fine particles contained in the heat sealant layer are the electrically conductive fine powder mainly composed of barium sulfate particles the surfaces of which are coated with the tin oxide doped with antimony, whereby the antistatic characteristics may be imparted to the cover material without losing the transparency of the heat sealant layer. Furthermore, since the intermediate layer can be peeled off at the interface to the heat sealant layer, the cover material can be peeled off stably and certainly, regardless of the heat-sealing strength between the heat sealant layer and the carrier tape.

DESCRIPTION OF THE PREFERRED EMBODIMENTS

Embodiments of the present invention will be described below with reference to the drawings.

Figure 1:
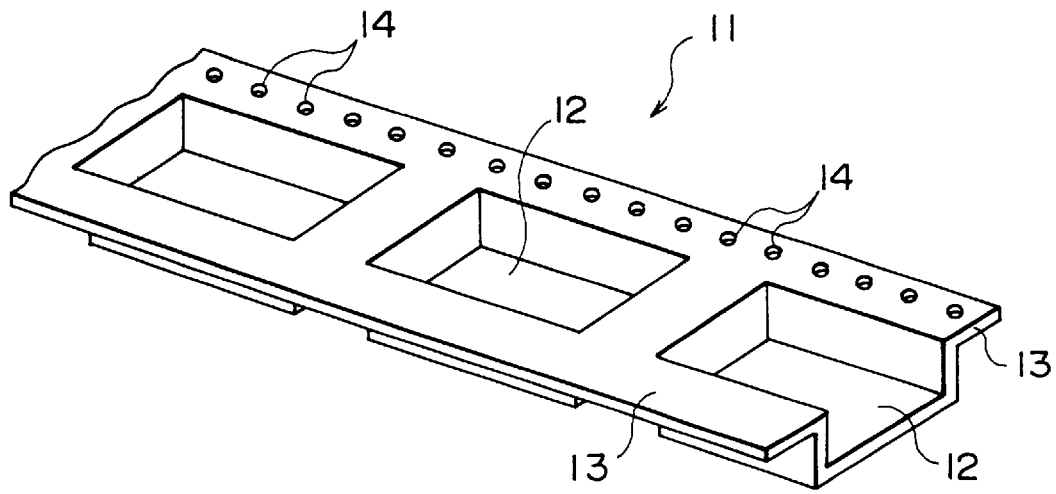
FIG. 1 is a perspective view to show an example of the carrier tape of the present invention.

FIG. 1 is a perspective view to show an example of the carrier tape of the present invention. In FIG. 1, a carrier tape 11 is provided with a plurality of embossed portions 12 arranged in line in a predetermined shape, and flange portions 13 are formed on the both sides of arrangement of the embossed portions 12. Further, feed holes (sprocket holes) 14 are formed at a predetermined pitch along the direction of arrangement of the embossed portions 12 on one flange portion 13.

Figure 8:
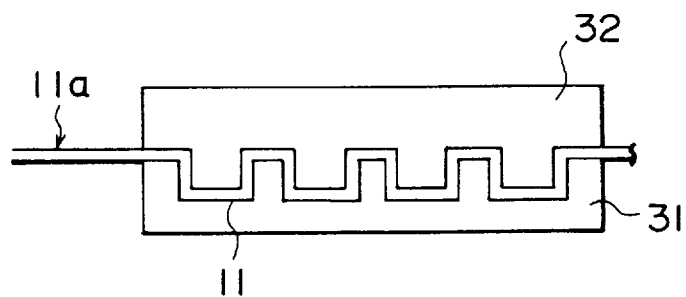
FIG. 8 is a drawing to show a step for producing the carrier tape.

The carrier tape 11 as described above can be produced by shaping a sheet composed of a polycarbonate resin, and 5 to 30% by weight of electrically conductive carbon fine particles in the polycarbonate resin. The polycarbonate resin has such a property that a deformable range by malleability is wider than those of the resins conventionally used for the carrier tape, such as a polyvinyl chloride resin, a polystyrene resin, a polypropylene resin, etc. Accordingly, the shaping of the carrier tape of the present invention may be based on a forming method without a pre-heating step, for example, the cold forming process for forming a sheet 11a of the above polycarbonate resin containing the electrically conductive carbon fine particles, particularly a polycarbonate resin having a melting point of at least 150° C., as shown in FIG. 8. In this case, a preferred arrangement is such that the mold is composed of a core die 32 and a cavity die 31, the mold temperature is controlled between 50° to 200° C., and a cooling die for molded article is set in the next step to the forming by the molding dies 31, 32. If the melting point of the polycarbonate resin used for the carrier tape of the present invention were below 150° C., the continuous heat resistance would be inadequate. Then long-term storage at temperatures above 50° C. would cause deflection, deformation due to stress relaxation, or a change in the pitch of the feed holes (sprocket holes), which is not preferable. Employing the cold forming process, the embossed portions can be formed by directly setting the resin sheet 11a on the mold without a need to pre-heat the resin sheet 11a. Thus, the forming process can obviate the conventional step to determine the dimensions of the mold, taking shrinkage or expansion of the resin sheet 11a upon pre-heating into account, and the embossed portions can be formed with very high stability of dimensional accuracy. Further, the carrier tape of the present invention has high heat resistance because it is made of the polycarbonate resin, and the electrically conductive carbon fine particles contained therein impart the antistatic property to the carrier tape. The electrically conductive carbon fine particles used preferably have an average particle size of about 0.01 to 0.5 μm.

The shape and size of the embossed portions 12 may suitably be determined, for example, in accordance with the shape of an article to be housed in each embossed portion 12 in the above carrier tape 11 of the present invention. Further, the thickness of the carrier tape 11 may usually be determined in the range of from 100 to 600 μm. Further, the diameter and pitch of the feed holes (sprocket holes) 14 may be arbitrarily set. Furthermore, in the illustrated example the feed holes (sprocket holes) 14 are formed in the one flange 13, but the feed holes (sprocket holes) 14 may be formed on the both flanges 13, or no feed holes (sprocket holes) may be formed on the flanges 13.

Figure 2:
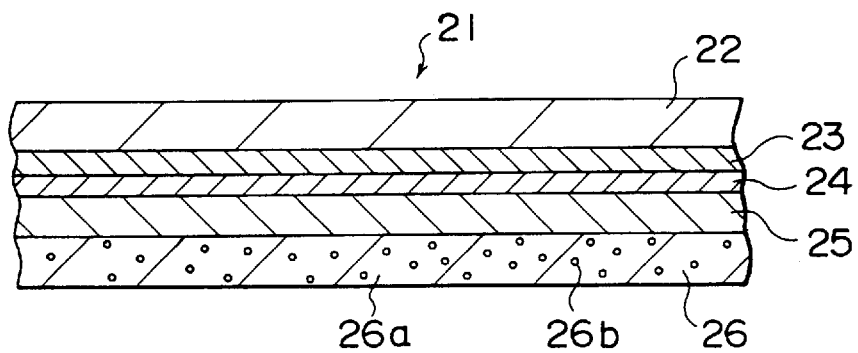
FIG. 2 is a schematic, cross-sectional view of the cover material of the present invention.

FIG. 2 is a schematic, sectional view of the cover material of the present invention. In FIG. 2, the cover material 21 comprises a biaxially oriented resin layer 22, and an intermediate layer 25 and a heat sealant layer 26 layered in this order on the biaxially oriented resin layer 22 through an adhesive layer 23 and a bonding layer 24.

The biaxially oriented resin layer 22 is required to endure heat from heating means in heat-sealing the cover material 21 to the above carrier tape of the present invention, and thus to produce no wrinkle. Further, it imparts adequate firmness to the entire cover material, and acts to give good wind-up suitability and mechanical suitability upon heat-sealing to the cover material. The biaxially oriented resin layer 22 may be a biaxially oriented film, for example, of a polyester resin such as a polyethylene terephthalate (PET), a polyolefin resin such as a polypropylene, or a polyamide resin such as a nylon. The thickness of the biaxially oriented resin layer 22 may suitably be set according to purposes of use of the cover material, and for example, it may be determined in the range of about 6 to 50 μm.

The bonding layer 24 formed between the biaxially oriented resin layer 22 and the intermediate layer 25 functions to make the heat and pressure uniform in heat-sealing. The bonding layer 24 may be made of either one polyolefin selected from a polyethylene, a polyethylene-vinyl acetate copolymer, an ionomer, a polypropylene, and modified products thereof, and the thickness thereof is preferably determined in the range of about 10 to 60 μm. If the thickness of the bonding layer 24 were less than 10 μm, a cushioning function would become worse. On the other hand, if it were above 60 μm, the heat-sealing property would be degraded. The adhesive layer 23 functions to improve laminate strength between the biaxially oriented layer 22 and the bonding layer 24, and adhesives of an isocyanate type, an imine type, a urethane type, etc. may be used for the adhesive layer 23. Further, a surface treatment including a corona treatment, a plasma treatment, or a sand blasted treatment, etc. may be preliminarily effected with necessity on the surface of the biaxially oriented resin layer 22 on which the adhesive layer 23 is formed, in order to enhance the adhesive property of the adhesive layer 23.

The bonding layer 24 may be formed by applying or extruding the adhesive over the biaxially oriented resin film through the adhesive layer 23, and the intermediate layer 25 may be formed on the bonding layer 24 by dry lamination or extrusion lamination.

Further, the biaxially oriented resin layer 22 and the intermediate layer 25 may be laminated by directly bonding them by the adhesive layer 23 without forming the bonding layer 24. In this case, the adhesives of the isocyanate type, imine type, urethane type, etc. may also be used for the adhesive layer 23. Furthermore, a surface treatment including the corona treatment, the plasma treatment, or the sand blasted treatment, etc. may be preliminarily effected with necessity on the surface of the biaxially oriented resin layer 22 on which the adhesive layer 23 is formed.

The intermediate layer 25 is made of a resin composition comprising 30 to 50% by weight of an ethylene-α-olefin copolymer having the density of from 0.915 to 0.940 g/cm$^3$, and 70 to 50% by weight of a styrene-butadiene block copolymer composed of 50 to 90% by weight of styrene and 50 to 10% by weight of butadiene.

The ethylene-α-olefin copolymer used for the intermediate layer 25 is a copolymer or the like of ethylene with, for example, butene, pentene, hexene, heptene, octene, or 4-methylpentene-1. If the density of the ethylene-α-olefin copolymer were below 0.915 g/cm$^3$ or above 0.940 g/cm$^3$, the film forming property of the intermediate layer 25 in combination with the styrene-butadiene block copolymer would be degraded, which is not preferable.

Further, if the styrene content in the styrene-butadiene block copolymer for forming the intermediate layer 25 were less than 50% by weight, stickiness of the film would increase, which makes handling difficult. On the other hand, if it should exceed 90% by weight, the adhesion property at low temperatures to the heat sealant layer 26 would become worse, which is not preferable.

Further, if the composition of the heat sealant layer 26 is constant, the mixing ratio of the ethylene-α-olefin copolymer with the styrene-butadiene block copolymer in the intermediate layer 25 greatly affects the peel strength in peeling off the cover material 21 after heat-sealing of the carrier tape made of the polycarbonate resin, and the transparency of the cover material 21. If an amount of the ethylene-α-olefin copolymer were less than 30% by weight and an amount of the styrene-butadiene block copolymer were over 70% by weight, the film forming property of the intermediate layer 25 would become degraded and the transparency of the intermediate layer 25 would also become lowered, whereby the transparency of the cover material 21 after formation of the heat sealant layer 26 described below would become worse. Furthermore, it is assumed that the adhesive strength between the intermediate layer 25 and the heat sealant layer 26 originates in the styrene-butadiene block copolymer while the ethylene-α-olefin copolymer functions as an adhesion inhibitor. If the amount of the styrene-butadiene block copolymer should exceed 70% by weight as described above, the adhesion strength between the intermediate layer 25 and the heat sealant layer 26 would be too strong, so that the peel strength of the cover material would result in exceeding an appropriate strength range described below, which is not preferable. On the other hand, if the amount of the ethylene-α-olefin copolymer were above 50% by weight and the amount of the styrene-butadiene block copolymer were below 50% by weight, the adhesion strength between the intermediate layer 25 and the heat sealant layer 26 would be too weak, so that the peel strength of the cover material would result in falling below the appropriate strength range, which is not preferable. If the composition of the heat sealant layer 26 were changed in order to obtain an appropriate peel strength while the amount of ethylene-α-olefin copolymer in the intermediate layer 25 is over 50% by weight, the transparency of the cover material 21 would be reduced as described below, which is not preferable.

The thickness of the above intermediate layer 25 is preferably determined usually in the range of about 10 to 60 μm. If the thickness of the intermediate layer were less than 10 μm, the film forming property would become worse. On the other hand, the heat-sealing property of the cover material 21 would become worse, if it were over 60 μm.

In addition, the cover material 21 of the present invention may be modified in such a manner that the intermediate layer 25 is constructed in a multi-layer structure in order to improve the film forming accuracy of the intermediate layer 25. In this case, a layer in contact with the heat sealant layer 26 needs to be made of the resin composition including 30 to 50% by weight of the ethylene-α-olefin copolymer having the density of from 0.915 to 0.940 g/cm$^3$, and 70 to 50% by weight of the styrene-butadiene block copolymer composed of 50 to 90% by weight of styrene and 50 to 10% by weight of butadiene.

Figure 3:
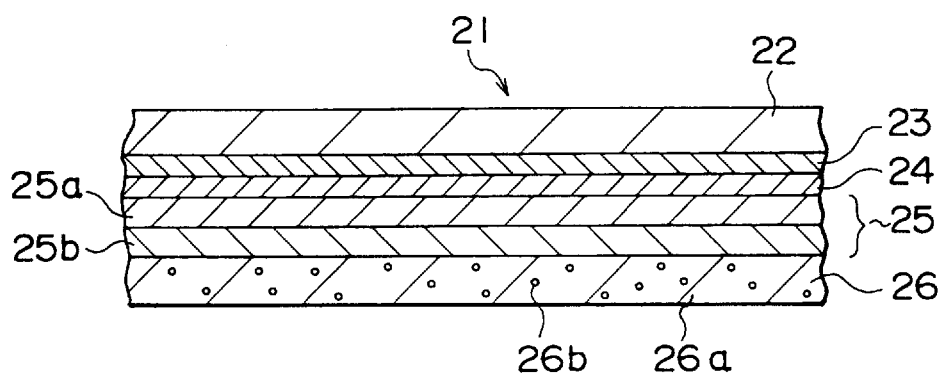
FIG. 3 is a schematic, cross-sectional view to show another example of the cover material of the present invention.

FIG. 3 shows a schematic, cross-sectional view to show another example of the cover material of the present invention, in which the intermediate layer is formed in a two-layer structure. The intermediate layer 25 is composed of a first resin layer 25a and a second resin layer 25b. In this case, the first resin layer 25a is made of the ethylene-α-olefin copolymer having the density of from 0.915 to 0.940 g/cm$^3$. Then the second resin layer 25b in contact with the heat sealant layer 26 is made of the resin composition including 30 to 50% by weight of the ethylene-α-olefin copolymer having the density of from 0.915 to 0.940 g/cm$^3$, and 70 to 50% by weight of the styrene-butadiene block copolymer comprising 50 to 90% by weight of styrene and 50 to 10% by weight of butadiene. The thicknesses of the first resin layer 25a and the second resin layer 25b may be determined each in the range of about 5 to 30 μm.

Figure 4:
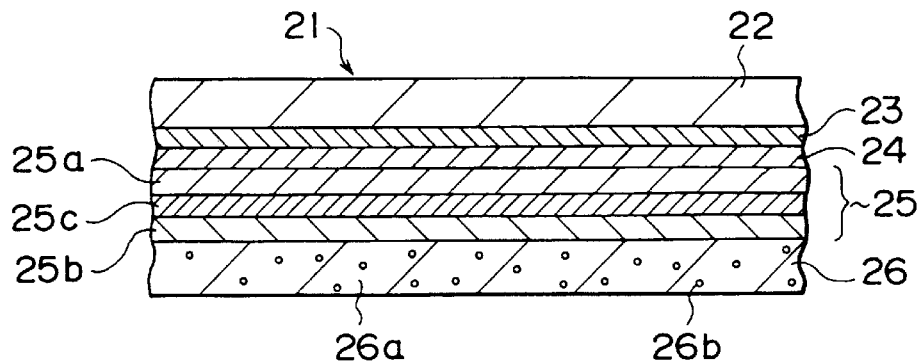
FIG. 4 is a schematic, cross-sectional view to show another example of the cover material of the present invention.

FIG. 4 shows a schematic, cross-sectional view to show another example of the cover material of the present invention, in which the intermediate layer is constructed in a three-layer structure. The intermediate layer 25 is composed of the first resin layer 25a, the second resin layer 25b, and a third resin layer 25c formed between the first resin layer 25a and the second resin layer 25b. In this case, the first resin layer 25a is made of the ethylene-α-olefin copolymer having the density of from 0.915 to 0.940 g/cm$^3$. The second resin layer 25b in contact with the heat sealant layer 26 is made of the resin composition including 30 to 50% by weight of the ethylene-α-olefin copolymer having the density of from 0.915 to 0.940 g/cm$^3$, and 70 to 50% by weight of the styrene-butadiene block copolymer composed of 50 to 90% by weight of styrene and 50 to 10% by weight of butadiene. The third resin layer 25c is a layer having a larger mixing ratio of the ethylene-α-olefin copolymer than that of the second resin layer 25b. The thicknesses of the first resin layer 25a, the second resin layer 25b, and the third resin layer 25c may be determined each in the range of about 3 to 20 μm.

The above intermediate layer 25 can be formed by the dry lamination process or the extrusion lamination process. That is, the intermediate layer 25 can be formed by the usual film forming process such as the inflation process, the T-die process, etc.

Since the cover material 21 of the present invention has the intermediate layer 25 as described above, ply separation occurs between the intermediate layer 25 and the heat sealant layer 26 in peeling off the cover material 21 heat-sealed to the carrier tape made of the polycarbonate resin therefrom. In this case, the peel strength is determined to be weaker than the heat-sealing strength between the heat sealant layer 26 described below and the carrier tape made of the polycarbonate resin, preferably in the range of 100 to 800 g/15 mm. If the peel strength were less than 100 g/15 mm, there could be such a risk that ply separation occurs between the intermediate layer 25 and the heat sealant layer 26 during transportation of the container after heat-sealing of the cover material, thereby dropping the contents. Further, if the peel strength were above 800 g/15 mm, there could be such a risk that the contents spring out because of vibration of the carrier tape made of the polycarbonate resin upon peeling off the cover material, which is not preferable. It is noted that the peel strength as described above is values measured in 180° peeling (at peeling speed=300 mm/min) under an atmosphere of 23° C. and 40% RH.

Accordingly, after heat-sealing is effected on the carrier tape made of the polycarbonate resin with the sufficiently high heat-sealing strength of the heat sealant layer 26, the cover material 21 can certainly be peeled off from the carrier tape made of the polycarbonate resin.

The heat sealant layer 26 forming the cover material 21 of the present invention comprises a thermoplastic resin 26a and electrically conductive fine powders 26b composed of barium sulfate particles the surfaces of which are coated with tin oxide doped with antimony.

The thermoplastic resin 26a used for the heat sealant layer 26 is preferably a resin mixture of a polyurethane resin and a vinyl chloride-vinyl acetate copolymer resin, and a mixing ratio thereof is preferably determined in the range of 75:25 to 85:15. If the amount of the polyurethane resin were less than the above mixing ratio, the viscosity of the composition of the resin mixture would increase so as to make application and formation of the heat sealant layer difficult. Further, the adhesion strength to the above intermediate layer 25 would become too strong and the peel strength would exceed the above appropriate range (100–800 g/15 mm), which is not preferable. On the other hand, if the amount of the polyurethane resin were more than the mixing ratio, the peel strength would become below the above appropriate range (100–800 g/15 mm), which is not preferable. Specific examples of the above polyurethane resin are Nipporan 5120 available from Nippon Polyurethane Kogyo (KK), and KL494 available from Arakawa Kagaku (KK). Further, specific examples of the vinyl chloride-vinyl acetate copolymer resin are Vinylite VAGH, Vinylite VACH, and Vinylite VACA available from Union Carbide Company.

The following is the reason why the electrically conductive fine powders 26b composed of the barium sulfate particles the surfaces of which are coated with tin oxide doped with antimony are used as the electrically conductive fine powder contained in the heat sealant layer 26. An electrically conductive tin oxide type fine powders 26b generally used are single compound powders in which the oxygen atom in the tin oxide molecule is replaced by an antimony atom by the ion doping method. Therefore, the particle sizes thereof are not more than 0.15 μm, which is advantageous in respect of the transparency of the heat sealant layer. However, contact among particles of the electrically conductive fine powder needs to be increased in order to impart sufficient conductivity to the heat sealant layer, and the addition amount of the electrically conductive fine powders 26b in the heat sealant layer needs to be increased for that purpose. However, the tin oxide doped with antimony is relatively expensive, which will give rise to an increase of the manufacturing cost of the cover material 21. On the other hand, the barium sulfate particles coated with the above tin oxide have large particle sizes, which are as large as from 0.15 to 1.5 μm. Thus, the addition amount of the electrically conductive fine powders 26b for imparting sufficient conductivity to the heat sealant layer 26 can be decreased by that extent. Further, the cost of the electrically conductive fine powders 26b is also low, which is advantageous in that the manufacturing cost of the cover material can be reduced.

As described above, the average particle size of the electrically conductive fine powders 26b used for the heat sealant layer 26 of the present invention is in the range of about 0.15 to 1.5 μm as primary particles, and the weight ratio of the electrically conductive fine powders 26b to the thermoplastic resin in the heat sealant layer 26 is preferably in the range of 5:5 to 7:3. If the amount of the electrically conductive fine powders 26b were over the above range, the transparency of the heat sealant layer 26 would become worse, and the peel strength would exceed the above appropriate range (100–800 g/15 mm), which is not preferable. On the other hand, if the amount of the electrically conductive fine powders 26b were less than the above range, the peel strength would be lower than the above appropriate range (100–800 g/15 mm), and adequate surface resistivity and electric charge attenuation time as described below could not be obtained.

Here, the thickness of the heat sealant layer 26 is preferably in the range of 0.5 to 5 μm, and particularly preferably in the range of 0.8 to 2 μm.

The above heat sealant layer 26 has a surface resistivity of from $10^5$ to $10^9$ Ω/□ at 22° C. and under 40% RH, and the electric charge attenuation time required for 99% attenuation from 5000 V at 23°±5° C. and under 12±3% RH is not more than a second, thereby showing the excellent electrostatic properties. If the surface resistivity were over $10^9$ Ω/□, the effect of electrostatic diffusion would become extremely worse, which would make it difficult to protect the electronic parts from the electrostatic destruction. Further, if it were less than $10^5$ Ω/□, an electric current could pass through the cover material from the outside to the electronic parts, thus raising a risk that the electronic parts are electrically destroyed. On the other hand, if the electric charge attenuation time, which is a guide for diffusion speed of an electric charge generated by static electricity, were over one second, the effect of electrostatic diffusion would become extremely worse, which would make it difficult to protect the electronic parts from the electrostatic destruction. Here, the surface resistivity and the electric charge attenuation time may be measured in accordance with MIL-B-81705C, which is the U.S. Army standard.

The heat sealant layer 26 may contain an additive such as a dispersion stabilizer, a surfactant, a blocking inhibitor, etc., if necessary.

The heat sealant layer 26 may be applied to and formed on the intermediate layer 25 by a coating method selected from the air doctor coating method, the blade coating method, the knife coating method, the rod coating method, the direct roll coating method, the reverse-roll coating method, the gravure coating method, the slide coating method, the slot orifice coating method, etc.

The cover material 21 of the present invention as described above has such transparency that the overall transmittance is at least 70% and the haze is not more than 75%. Accordingly, after packing contents in the embossed portions of the carrier tape made of the polycarbonate resin and heat-sealing the cover material 21 to the carrier tape to seal it, presence or absence of the contents and packing conditions can be checked and confirmed by visual observation.

Further, since ply separation occurs between the intermediate layer 25 and the heat sealant layer 26 in the cover material 21 of the present invention, it has a stable peeling property independent of the heat-sealing conditions thereof to the carrier tape made of the polycarbonate resin.

Figure 5:
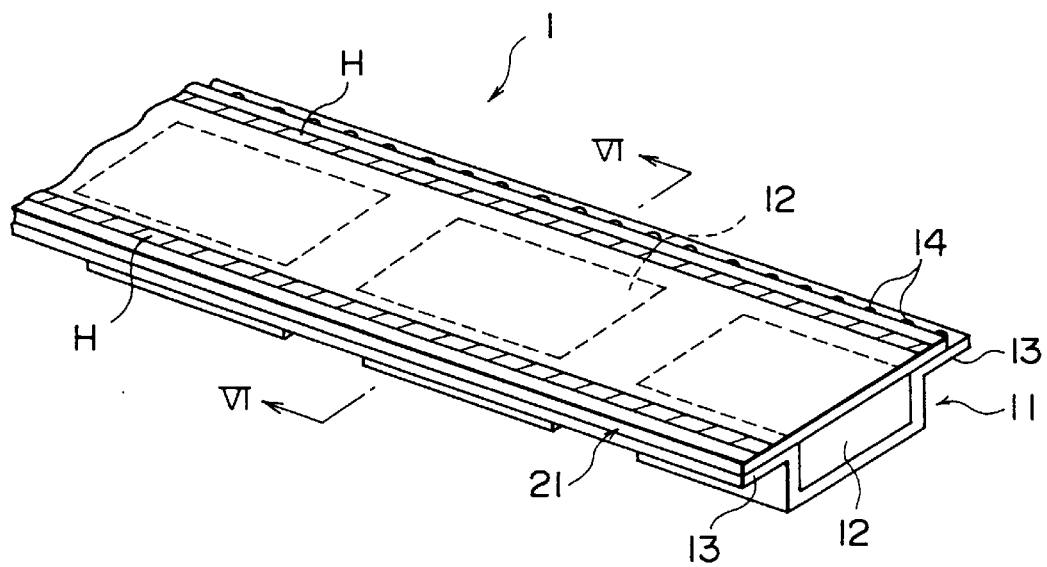
FIG. 5 is a perspective view to show an example of the taping apparatus of the present invention.
Figure 6:
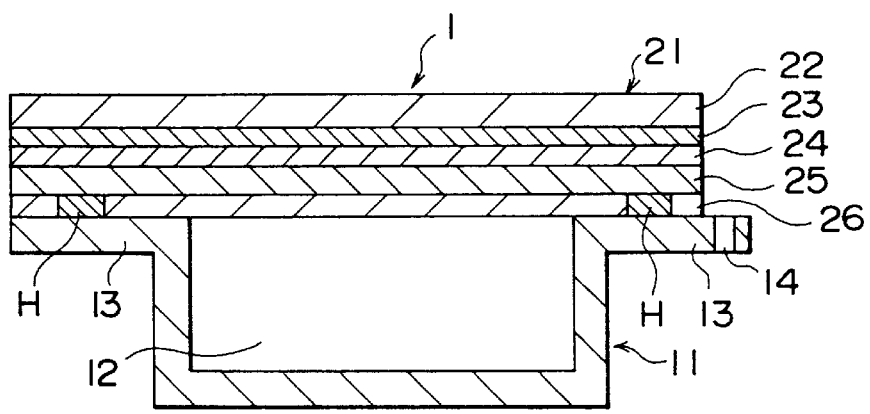
FIG. 6 is a cross-sectional view taken along VI—VI line in FIG. 5.
Figure 7:
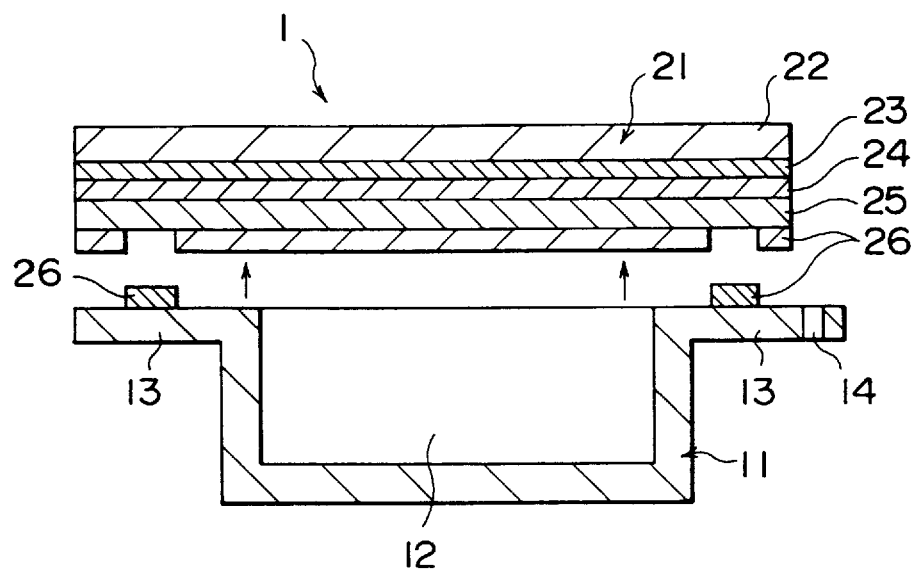
FIG. 7 is a drawing, corresponding to FIG. 6, to show a state where the cover material is separated from the carrier tape.

Next, an example of the embossed carrier type taping apparatus of the present invention is explained referring to FIG. 5 and FIG. 6, and then the above ply separation in the cover material of the present invention is described with this taping as an example, referring to FIG. 7. FIG. 5 and FIG. 6 show the embossed carrier type taping apparatus 1 of the present invention constituted by heat-sealing the cover material 21 as shown in FIG. 2 to the carrier tape 11 having the embossed portions 12 as shown in FIG. 1. In the taping apparatus 1, the cover material 21 is superimposed on the carrier tape 11 so as not to cover the feed holes (sprocket holes) 14 of the carrier tape 11, and then heat-sealing is effected in lines with a predetermined width on the both sides of the embossed portions 12. In the illustrated example, the linear heat-sealing portions H are shown as the hatched portions. In this state, the adhesive strength between the intermediate layer 25 and the heat sealant layer 26 of the cover material 21 is in the range of 100 to 800 g/15 mm, which is smaller than the heat-sealing strength between the heat sealant layer 26 and the carrier tape 11. Next, when the cover material 21 is peeled off from the carrier tape 11, the linear heat-sealing portions H of the heat sealant layer 26 remain as heat-sealed on the carrier tape 11, and ply separation occurs between the intermediate layer 25 and the heat sealant layer 26. Accordingly, the cover material 21 is peeled off in such a state that the linear heat-sealing portions H in the heat sealant layer 26 remain on the carrier tape (see FIG. 7). Namely, the cover material 21 of the present invention has the conflicting properties, the high heat-sealing property to the carrier tape 11 and the easy peeling-off property upon peeling.

Next, the present invention is described in further detail with a specific example.

EXAMPLE

A biaxially oriented polyethylene terephthalate (PET) film (Espet 6140 manufactured by Toyoboseki (KK), the thickness of 12 μm, a corona-treated product) was prepared as the biaxially oriented resin layer.

Further, an isocyanate type two-part setting adhesive for dry lamination (Takenate A50, Takerack A515 manufactured by Takeda Yakuhin Kogyo (KK)) was prepared as the adhesive layer.

Next, in order to form the intermediate layer, the following linear low-density polyethylene (L•LDPE) and S•B copolymer were prepared as the ethylene-α-olefin copolymer and as the styrene-butadiene block (S•B)•copolymer composed of 50 to 90% by weight of styrene and 50 to 10% by weight of butadiene, respectively, and a single-layer film was obtained by the inflation process.

L•LDPE: Ultzex 3550A manufactured by Mitsui Sekiyu Kagaku Kogyo (KK)

Density=0.925 g/cm³
S•B copolymer: Asaflex 810 manufactured by Ashahi Kasei Kogyo (KK)

Further, prepared in order to form the heat sealant layer were the following polyurethane resin, vinyl chloride-vinyl acetate copolymer resin, and electrically conductive fine powder composed mainly of barium sulfate particles the surfaces of which were coated with tin oxide doped with antimony.

Polyurethane resin: Nipporan 5120 manufactured by Nippon Polyurethane Kogyo (KK)

Vinyl chloride-vinyl acetate copolymer resin: Vinylite VAGH manufactured by Union Carbide (KK)

Electrically conductive fine powder: Pastran IV manufactured by Mitsui KinzokuKogyo (KK)

Average particle size=0.3 μm

Then, using these materials, the intermediate layer (thickness: 30 μm) was first laminated by dry lamination on the adhesive layer formed on the PET film under the mixing conditions of L•LDPE and S•B copolymer as shown in the following Table 1, thereby obtaining a film of PET/adhesive layer/intermediate layer. Then, the heat sealant layer (thickness: 2 μm) having the composition from the following Table 1 was formed by the gravure reverse method on the intermediate layer, thereby obtaining the cover material (Samples 1–13).

TABLE 1

| | Composition of Intermediate Layer | | Composition of Heat Sealant Layer | | |
|---|---|---|---|---|---|
| Cover Material | L*LDPE | S*B Copolymer | Polyurethane Resin | Vinyl Chloride- Acetate Copolymer | Electrically Conductive Fine Powder |
| Sample 1 | 40 | 60 | 79 | 20 | 150 |
| Sample 2 | 40 | 60 | 79 | 20 | 220 |
| Sample 3 | 40 | 60 | 79 | 20 | 100 |
| Sample 4 | 40 | 60 | 75 | 25 | 150 |
| Sample 5 | 40 | 60 | 85 | 15 | 150 |
| Sample 6 | 50 | 50 | 79 | 20 | 150 |
| Sample 7 | 30 | 70 | 79 | 20 | 150 |
| Sample 8 | 40 | 60 | 79 | 20 | 240 |
| Sample 9 | 40 | 60 | 79 | 20 | 95 |
| Sample 10 | 40 | 60 | 70 | 30 | 150 |
| Sample 11 | 40 | 60 | 90 | 10 | 150 |
| Sample 12 | 70 | 30 | 79 | 20 | 150 |
| Sample 13 | 20 | 80 | 79 | 20 | 150 |
| Comparative Sample 1 | 40 | 60 | 75 | 25 | 300 |

*Values in Table 1 are given in parts by weight.
**Vinyl chloride acetate copolymer represents vinyl chloride-vinyl acetate copolymer Further, Comparative Sample 1 was produced in the same manner as Sample 1 shown in above Table 1 except that the following electrically conductive carbon fine particles were used as the electrically conductive fine powder contained in the heat sealant layer.

Electrically conductive carbon fine particles: Printex XE2 manufactured by Daitai Kako (KK)

Average particle size=0.4 $\mu$m

Next, the haze, overall transmittance, surface resistivity, and electric charge attenuation time were measured under the following conditions for the above cover materials (Samples 1–13, Comparative Sample 1). Furthermore, each of the above cover materials was heat-sealed to a polycarbonate resin substrate containing electrically conductive carbon fine particles (average particle size: 0.03 $\mu$m) (Microhole KL3-1011 manufactured by Bier (KK)) by using a heat seal bar under the conditions of 180° C., 0.5 second, and 30 kgf/cm². Thereafter, the peel strength was measured under the below conditions.

Measurement conditions of haze and overall transmittance

Measured by Color Computer SM-5SC manufactured by Suga Shikenki (KK).

Measurement conditions of surface resistivity

Measured at 22° C. and under 40% RH by Hi-rester IP manufactured by Mitsubishi Yuka (KK).

Measurement conditions of electric charge attenuation time

The time required for 99% attenuation from 5000 V at 23°±5° C. and under 12±3% RH was measured by Static Decay Meter-406C manufactured by ETS Incorporation (Electro-Tech Systems, Inc) in accordance with MIL-B-81705C.

Measurement conditions of peel strength

Measured at 23° C. and under 40% RH by Tensiron universal tester HTH-100 manufactured by Toyo Boldwin (KK). (Peeling speed=300 mm/min, 180° peeling)

The following Table 2 shows the measurement results in the above items and peeling forms with respect to the cover materials.

TABLE 2

| Cover Material | Haze (%) | Overall Transmittance (%) | Surface Resistivity ($\Omega$) | Electric charge Attenuation Time (sec) | Peel Strength (g/15mm) | Peeling Form |
|---|---|---|---|---|---|---|
| Sample 1 | 40 | 90 | $10^8$ | 0.1 | 400 | Ply Separation |
| Sample 2 | 72 | 76 | $10^6$ | 0.1 | 750 | " |
| Sample 3 | 20 | 92 | $10^9$ | 0.1 | 120 | " |
| Sample 4 | 40 | 90 | $10^8$ | 0.1 | 300 | " |
| Sample 5 | 40 | 90 | $10^8$ | 0.1 | 800 | " |
| Sample 6 | 45 | 76 | $10^8$ | 0.1 | 250 | " |
| Sample 7 | 35 | 90 | $10^8$ | 0.1 | 750 | " |
| Sample 8 | 80 | 80 | $10^5$ | 0.1 | 900 | " |
| Sample 9 | 30 | 92 | $10^{10}$ | 1.2 | 50 | " |
| Sample 10 | 40 | 88 | $10^8$ | 0.1 | 90 | " |
| Sample 11 | 40 | 88 | $10^8$ | 0.1 | 820 | " |
| Sample 12 | 30 | 91 | $10^8$ | 0.1 | 90 | " |
| Sample 13 | 80 | 74 | $10^8$ | 0.1 | 800 | " |

TABLE 2-continued

| Cover Material | Haze (%) | Overall Transmittance (%) | Surface Resistivity (Ω) | Electric charge Attenuation Time (sec) | Peel Strength (g/15mm) | Peeling Form |
|---|---|---|---|---|---|---|
| Comparative Sample 1 | 85 | 5 | $10^5$ | 0.1 | 600 | " |

*peeling form *** ply separation: a form wherein separation occurs at the interface between the intermediate layer and the heat sealant layer and the heat sealant layer remains on the substrate.

As shown in Table 2, Samples 1–7 had good transparency and electrostatic properties, and ply separation occurred at the interface between the intermediate layer and the heat sealant layer by appropriate peel strength.

On the other hand, the haze of Sample 8 was over 75% while the transparency was inadequate, because the content of the electrically conductive fine powder in the heat sealant layer was rather large. In contrast, the peel strength of Sample 9 was below the appropriate strength, and the electrical properties were lowered; i.e., the surface resistivity was over $10^{10}$ Ω/□ and the electric charge attenuation time was over one second, because the content of the electrically conductive fine powder was rather small. Further, since the content of the polyurethane resin in the heat sealant layer in Sample 10 was rather small and, inversely, since the polyurethane resin content in Sample 11 was rather large, Sample 10 was below the appropriate peel strength and Sample 11 was high in the viscosity of the sealant ink, which degraded coating operability. Furthermore, since Sample 12 contained a rather large amount of L•LDPE in the intermediate layer, the peel strength was below the appropriate peel strength, and gelation of styrene during film formation of the S•B copolymer degraded the compatibility with L•LDPE, resulting in forming holes. On the other hand, Sample 13 was rather low in the content of L•LDPE, so that the haze was over 75% and the transparency was lowered.

Further, Comparative Sample 1 was inadequate both in the haze and overall transmittance, so that the transparency was low.

As detailed above, since the carrier tape provided with a plurality of embossed portions is made of the polycarbonate containing 5 to 30% by weight of electrically conductive carbon fine particles, according to the present invention, the carrier tape has the good antistatic property, excellent heat resistance, and high stability of dimensional accuracy. Further, the heat sealant layer forming the cover material is the layer wherein the electrically conductive fine powder composed mainly of barium sulfate particles the surfaces of which are coated with tin oxide doped with antimony is dispersed in the thermoplastic resin, and the cover material thus shows the good antistatic property while maintaining the transparency thanks to the heat sealant layer. Furthermore, the intermediate layer located adjacent to the heat sealant layer and between the biaxially oriented resin layer and the heat sealant layer is made of the resin composition composed of 30 to 50% by weight of the ethylene-α-olefin copolymer having the density of from 0.915 to 0.940 g/cm³ and 70 to 50% by weight of the styrene-butadiene block copolymer composed of 50 to 90% by weight of styrene and 50 to 10% by weight of butadiene. Thus, when the cover material is peeled off from the taping formed by heat-sealing the cover material to the above carrier tape so as to cover the embossed portions, ply separation takes place between the intermediate layer and the heat sealant layer. This achieves the good peeling property while maintaining the high adhesive property of the heat sealant layer, and facilitates setting of the heat-sealing conditions between the carrier tape made of the polycarbonate and the cover material.

What is claimed is:

1. A cover tape comprising:
   a biaxially oriented resin layer,
   a heat sealant layer comprising a thermoplastic resin, and an electrically conductive fine powder dispersed therein and composed of barium sulfate particles, the surfaces of which are coated with tin oxide doped with antimony, said heat sealant layer having a surface resistivity of from $10^5$ to $10^9$ Ω/□ and an electric charge attenuation time of a second or less, and
   an intermediate layer located adjacent to said heat sealant layer and between said biaxially oriented resin layer and said heat sealant layer,
   wherein said intermediate layer comprises a resin composition including 30 to 50% by weight of an ethylene-α-olefin copolymer having a density of from 0.915 to 0.940 g/cm³, and 70 to 50% by weight of a styrene-butadiene block copolymer composed of 50 to 90% by weight of styrene and 50 to 10% by weight of butadiene.

2. A cover tape according to claim 1, wherein the weight ratio of said electrically conductive fine powder and said thermoplastic resin constituting said heat sealant layer is in a range of 5:5 to 7:3.

3. A cover tape according to claim 1, wherein said thermoplastic resin forming said heat sealant layer is a resin mixture of a polyurethane resin and a vinyl chloride-vinyl acetate copolymer resin.

4. A cover tape according to claim 3, wherein the mixing ratio of the polyurethane resin and the vinyl chloride-vinyl acetate copolymer resin constituting said heat sealant layer is in a range of 75:25 to 85:15% by weight.

5. A cover tape according to claim 1, further comprising: an adhesive layer located adjacent to said biaxially oriented resin layer and between the biaxially oriented resin layer and the intermediate layer.

6. A cover tape according to claim 5, wherein said adhesive layer is selected from the group consisting of an isocyanate adhesive, an imine adhesive, or a urethane adhesive.

7. A cover tape according to claim 5, further comprising: a bonding layer located between the adhesive layer and the intermediate layer, said bonding layer maintaining heat and pressure constant in heat-sealing.

8. A cover tape according to claim 7, wherein said bonding layer is comprised of any one polyolefin selected from the group consisting of a polyethylene, a polyethylene-vinyl acetate copolymer, an ionomer, a polypropylene, and modified products thereof.

9. A cover tape comprising:

a biaxially oriented resin layer, a heat sealant layer comprising a thermoplastic resin, and an electrically conductive fine powder dispersed therein and composed of barium sulfate particles, the surfaces of which are coated with tin oxide doped with antimony, said heat sealant layer having a surface resistivity of from $10^5$ to $10^9$ $\Omega/\square$ and an electric charge attenuation time of a second or less, and an intermediate layer located adjacent to said heat sealant layer and between said biaxially oriented resin layer and said heat sealant layer and between said biaxially oriented resin layer and said heat sealant layer, wherein the intermediate layer is composed of multiple layers, among which at least one layer adjacent to the heat sealant layer comprises a resin composition including 30 to 50% by weight of an ethylene-α-olefin copolymer having a density of from 0.915 to 0.940 g/cm$^3$, and 70 to 50% by weight of a styrene-butadiene block copolymer composed of 50 to 90% by weight of styrene and 50 to 10% by weight of butadiene.

* * * * *